Figure 1:
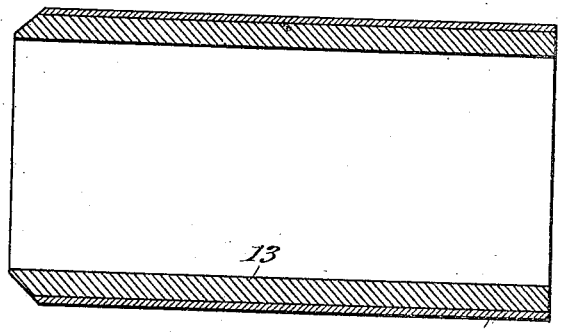

J. W. AYLSWORTH.
APPARATUS FOR MAKING DUPLICATE PHONOGRAPH RECORDS.
APPLICATION FILED APR. 4, 1907.

936,275.

Patented Oct. 5, 1909.
4 SHEETS—SHEET 1.

Witnesses:
Frank D. Lewis
Anna R. Klehm

Inventor:
Jonas W. Aylsworth
by Frank L. Dyer
Atty.

J. W. AYLSWORTH.
APPARATUS FOR MAKING DUPLICATE PHONOGRAPH RECORDS.
APPLICATION FILED APR. 4, 1907.
936,275.
Patented Oct. 5, 1909.
4 SHEETS—SHEET 2.
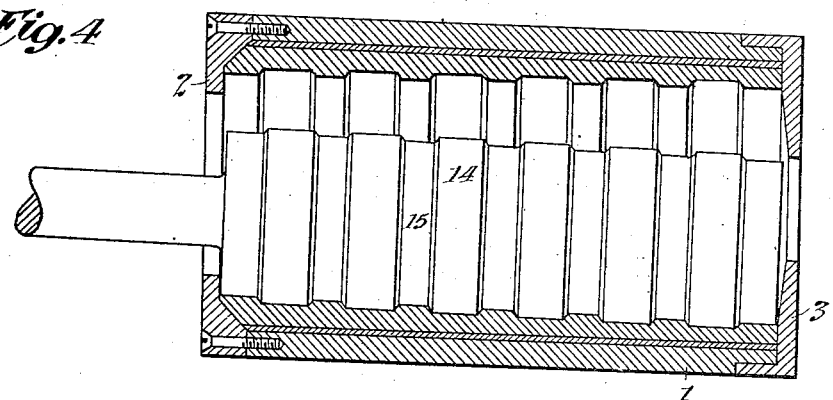
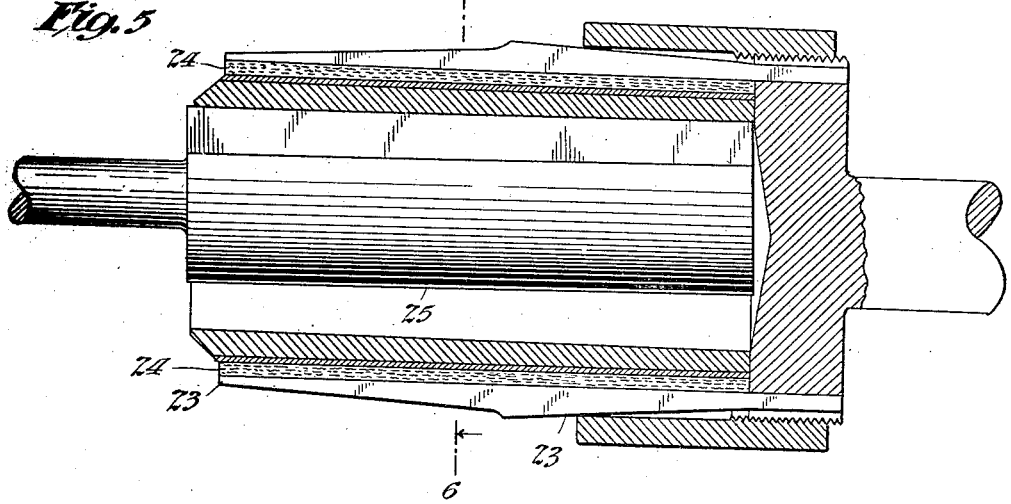
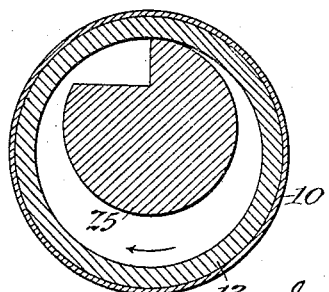

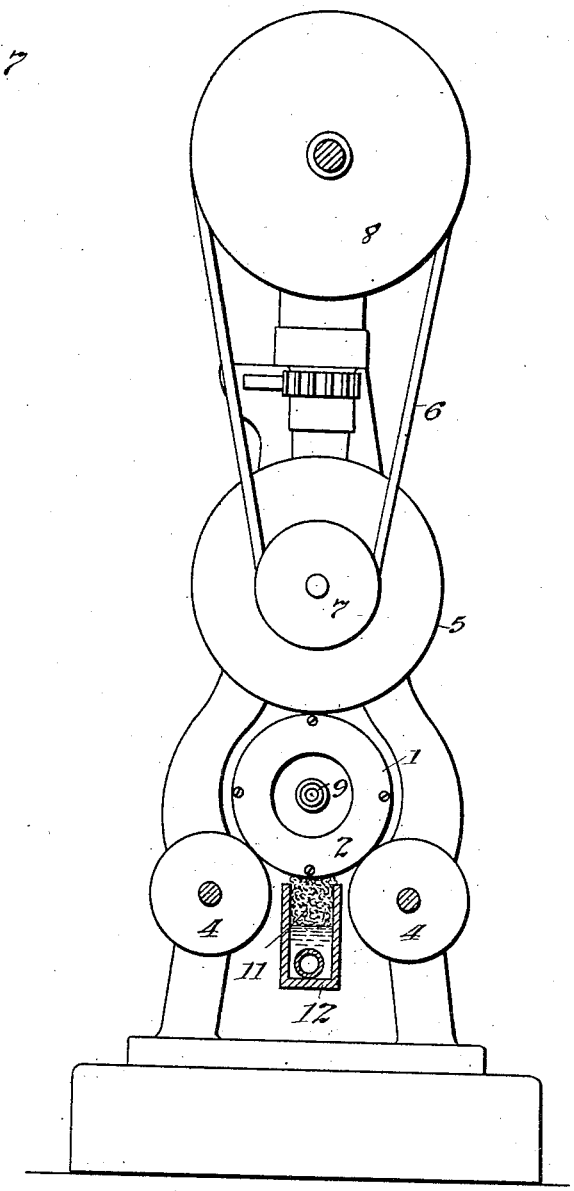

J. W. AYLSWORTH.
APPARATUS FOR MAKING DUPLICATE PHONOGRAPH RECORDS.
APPLICATION FILED APR. 4, 1907.
936,275.
Patented Oct. 5, 1909.
4 SHEETS—SHEET 4.
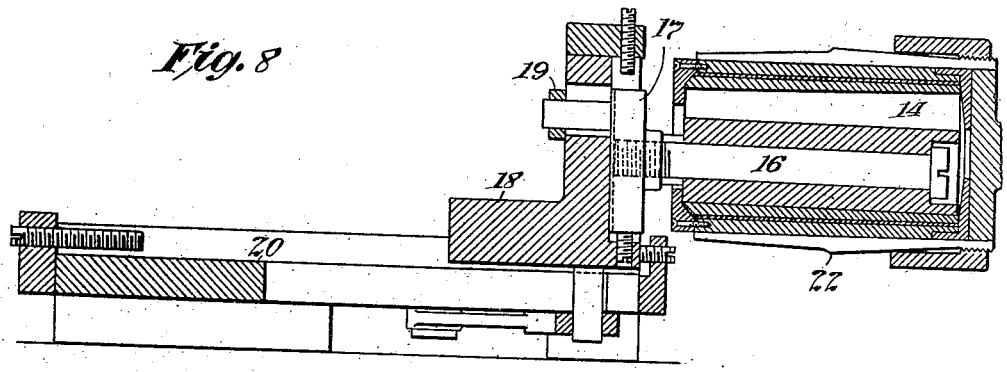
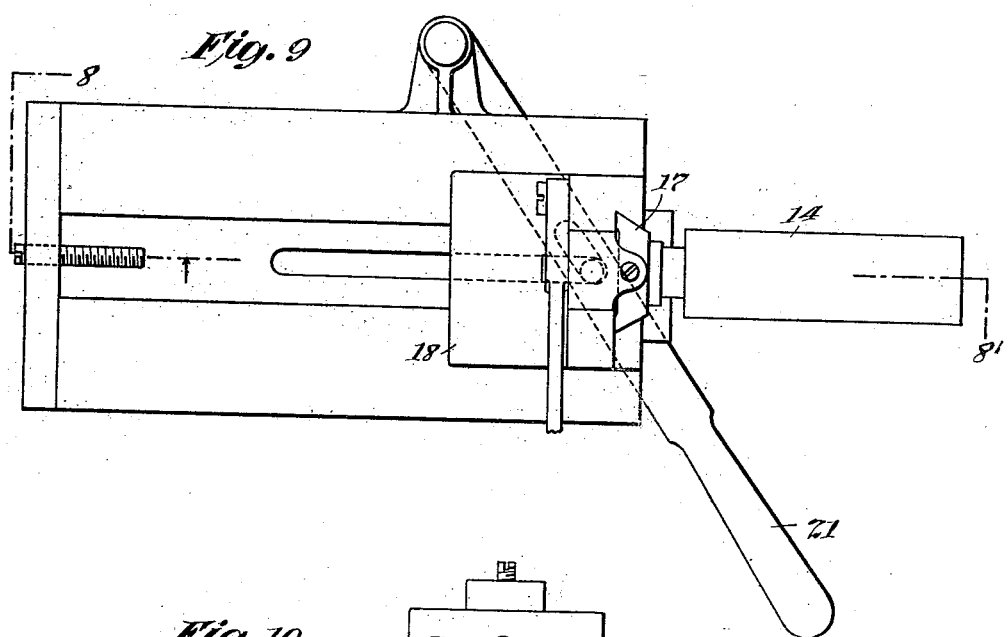
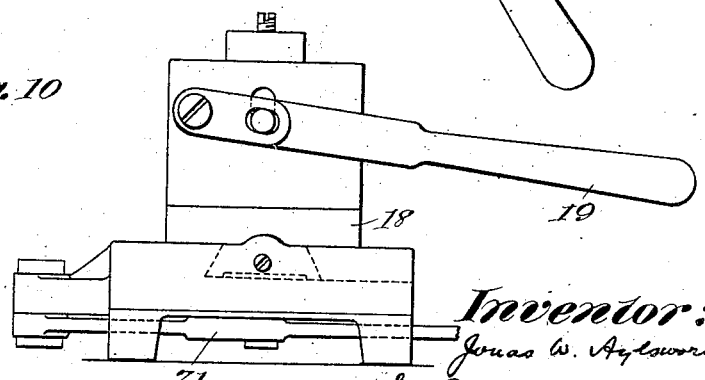
Witnesses:
Frank D. Lewis
Irma R. Klehm
Inventor:
Jonas W. Aylsworth
By Frank L. Dyer
Atty.

UNITED STATES PATENT OFFICE.

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

APPARATUS FOR MAKING DUPLICATE PHONOGRAPH-RECORDS.

936,275.  Specification of Letters Patent.  Patented Oct. 5, 1909.

Original application filed May 31 1906, Serial No. 319,422. Renewed April 23, 1907, Serial No. 369,755.
Divided and this application filed April 4, 1907. Serial No. 366,248.

*To all whom it may concern:*

Be it known that I, JONAS W. AYLSWORTH, a citizen of the United States, residing at East Orange, county of Essex, and State of New Jersey, have invented certain new and useful Improvements in Apparatus for Making Duplicate Phonograph-Records, of which the following is a description.

This application is a division of application filed May 31, 1906, renewed Apr. 23, 1907, #369,755 which has matured into Patent No. 855,606, granted June 4, 1907.

My invention relates to improved apparatus for the manufacture of duplicate phonograph records being particularly adapted for the production of an improved record which will be claimed in another application but which may be employed for the manufacture of records of other types.

The improved record referred to is a composite cylindrical structure, having an outer layer of a tough, smooth, amorphous material, in which the record surface is formed and from which a smooth and brilliant reproduction can be obtained, and a main body or support therefor composed of a very cheap and tough material unsuitable itself for receiving a record surface, the two layers being welded together so as to constitute practically a single homogeneous structure, as I will more fully hereinafter describe.

The process for which the present invention is particularly adapted is one in which the material in a molten state or in solid or powdered form is introduced into a rapidly rotating mold, as I describe in Patents Nos. 855,553, 855,554 and 855,605, granted June 4, 1907, the outer layer being first formed by the centrifugal force developed and, when the material thereof is sufficiently set but preferably while still slightly plastic, the material to constitute the inner or main layer is introduced so as to be intimately welded to the outer layer. The process also contemplates the carrying on of operations by which the interior of the record may be suitably developed to fit the supporting mandrels of talking machines of the phonograph type, although if an expanding mandrel is employed as disclosed in the patent of Aylsworth and Dyer, dated June 4, 1907, No. 855,604, no separate finishing operation is necessary, since when the records are removed from the molds after being chilled therein, they will, as an inherent result of the process, be formed with perfectly smooth cylindrical bores.

In order that the invention may be better understood, attention is directed to the accompanying drawings, forming part of this specification, in which—

Figure 2:
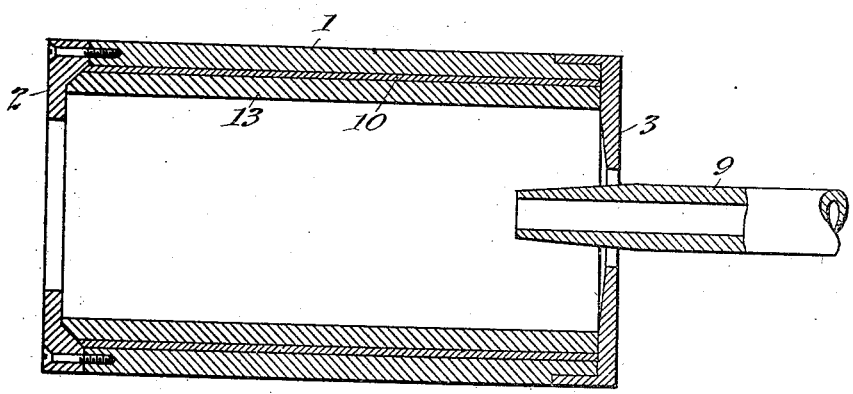
Figure 3:
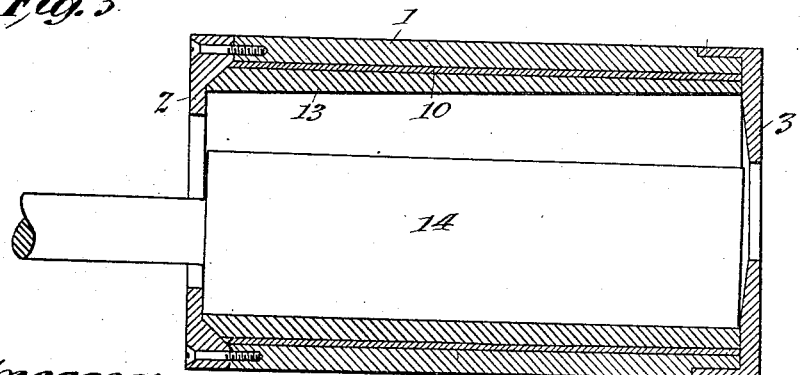

Figure 1, is a longitudinal sectional view of the improved duplicate phonograph record, Fig. 2, a similar view of the rotating mold, showing the formation of the record thereon, Fig. 3, a similar view illustrating the operation of tapering the bore of the record when desired, while still in a plastic condition within the mold, Fig. 4, a similar view illustrating the operation of forming the record on its bore with a series of concentric ribs. Fig. 5, a similar view, showing the reaming of the record, while cold, to taper its bore. Fig. 6, a section on the line 6—6 of Fig. 5, Fig. 7, an end view partly in section, showing convenient apparatus for rotating and cooling the mold, Fig. 8, a longitudinal sectional view of the apparatus used for finishing the bore of the record, while in a more or less plastic state within the mold, the section being taken on the line 8—8 of Fig. 9, Fig. 9, a plan view of the same with the mold and record removed, and Fig. 10, an end view.

In all of these views corresponding parts are represented by the same numerals of reference.

The mold 1 is of tubular form, carrying on its bore the representation in relief of the record to be duplicated and is produced in any suitable and convenient way, preferably by a process of vacuous deposit, as is well known in the art. This mold is provided with a stationary end flange 2, carrying the usual engraved matter for identifying the record, and with a removable end flange 3, adapted to be secured in place in any suitable way. While the record is being formed in the mold, the latter is rotated so as to cause the material to be uniformly distributed over the record surface by reason of the centrifugal force developed. Any suitable mechanism for this purpose may be used, but in Fig. 7, I illustrate a device of the character described in said Patent No. 855,605, above referred to, and comprising a pair of supporting rollers 4—4 on which the mold is carried, and a rubber-faced driving roller 5 for frictionally engaging and rotating the mold, said driving roller being rotated by a belt 6 and pulleys 7 and 8. Material may be introduced within the mold in a molten state, the mold being suitably heated so as to prevent the material from congealing thereon, and to permit the material to remain in a perfectly fluid state while it is being distributed over the record surface, as I disclose in my said Patent No. 855,605; or instead, the mold need not be heated provided it is very thin and the material is of sufficient bulk and is heated to a sufficient extent to bring the temperature of the mold up to or above the melting point of the material, as I disclose in my Patent No. 855,554; or instead, material may be introduced within a hot mold in the solid state, preferably in powdered or granular condition, which I disclose in said Patent No. 855,553. In whatever way or condition the material is introduced within the mold, the latter is rotated at the necessary speed to develop sufficient centrifugal force and the material is distributed uniformly over the record surface so as to form a relatively thin layer 10, which during the time of its distribution will be maintained in a fluid condition so as to displace any air or gas bubbles and result in a very perfect impression being taken. This outer or surface layer of the record is now caused to set or harden preferably by rapidly chilling the mold, for instance by a pad 11 carried by a trough 12, to which cooling water is admitted, as I describe in said Patent No. 855,605. When the material of the layer 10 has been thus set, and preferably while still slightly plastic and sticky, the material for the inner layer or body 13 of the record is introduced, the mold being still rotated, whereby the material will distribute itself uniformly over and with respect to the surfacing layer 10, and be intimately welded and associated therewith, so as to form practically a continuous structure. Unless the melting point of the surfacing layer 10 is considerably higher than the melting point of the material comprising the body 13, it will not be practicable to introduce the material for the latter layer in solid form, since it is important that after the surfacing layer has been properly distributed it should retain its solidified condition. Therefore, I introduce a material for the inner layer in the molten state and continue the rotation of the mold until the material has set sufficiently to retain its cylindrical form, the cooling pad 11, or other media being applied to the mold to result in the rapid cooling of the material.

If it is desired that the records should have a cylindrical bore, the operation will be now complete, and as soon as the record has contracted sufficiently to be removed from the mold, the flange 3 is first removed and the record is lifted out. If, however, it is desired that the record should be formed with a tapered bore either smooth or having a series of concentric ribs, a further finishing operation requires to be performed. This finishing of the record may be effected, while the record is still in a more or less plastic state, although sufficiently hard to retain its shape, by means of a mandrel 14, either smooth, as shown in Fig. 3, or provided with a series of grooves 15, to form concentric ribs on the record (Fig. 4). The mandrel 14 is mounted to rotate easily on a stationary stub-shaft 16, maintained at the proper angle to give the desired taper to the bore and carried in a vertically movable slide 17. The slide 17 is mounted in a head 18, and is adapted to be moved vertically by a lever 19. The head 18 slides horizontally on a suitable base 20, being actuated by a lever 21. During the finishing operation, the mold with its more or less plastic contents is carried in a suitable chuck 22, so as to be rotated thereby, and the lever 21 is operated so as to cause the mandrel 14 to enter the mold, after which the lever 19 is moved to depress the mandrel and result in the displacement of the plastic mass, so as to form a bore of the desired taper and shape, the mandrel 14 rotating as the material is displaced, as will be obvious. I find that in this way a tapered bore can be very perfectly formed in a record composed of material which cannot be effectively cut, while in a plastic state and hence while still engaging the mold. Many materials suitable for the formation of at least the interior of duplicate sound records are so viscid and sticky when in a plastic condition that any attempt to cut them in that state would be impossible. However, by displacing the material as described, by means of a rotatable mandrel, I can effectively finish the bores of records composed of extremely viscid materials. It is preferable that the mandrel 14 should be kept as cold as possible during the finishing operation, and it may, therefore be chilled before its introduction into the record, or be chilled while within the mold in any suitable way.

In Figs. 5 and 6, I illustrate the finishing of the record on its interior by a cutting operation performed after the record has become cold, and hence after it is freed from the mold. I make use of a chuck 23 of any suitable character, provided preferably with a lining 24 of soft material, such as felt and rubber so as not to scratch the record surface. The record is introduced within the chuck so as to be rotated thereby and a cutting tool 25 engages the bore so as to finish the same on the desired taper. As I have already indicated, the surfacing layer 10 of the record should be composed of a hard and extremely smooth material, so as to resist wear of the reproducer stylus, and eliminate scratching noises as much as possible. This surfacing layer may be made quite thin, so that a relatively expensive material for the same can be effectively used. An example of a suitable composition from which the surfacing layer may be formed is the special transparent composition described in my Patent No. 676,111, dated June 11th, 1901. A suitable example of material from which the inner or body layer may be formed, and which while being extremely cheap is at the same time tough and of approximately the same coefficient of expansion as the material above referred to, is the following: Asphalt 80 parts, stearin pitch 20 parts. In the make up of this composition the ingredients are melted and intimately mixed.

Having now described my invention, what I claim as new and desire to secure by Letters Patent is as follows:

1. Apparatus for finishing the interior of a duplicate phonograph record, comprising means for rotating the record in a semi-plastic state, a rotatable mandrel the surface of which is arranged at an angle to the axis of the record, and means for introducing the mandrel within the record and for engaging the same with the bore thereof so as to displace the semi-plastic material, substantially as and for the purposes set forth.

2. Apparatus for finishing the interior of duplicate phonograph records, comprising means for rotating the record in a semi-plastic state, a rotatable mandrel, whose surface is arranged at an angle to the axis of the record, means for moving the mandrel horizontally for introducing the same within the record, and means for moving the mandrel vertically for engaging the same with the bore of the record to displace some of the material forming the latter, substantially as and for the purposes set forth.

3. Apparatus for finishing the interior of duplicate phonograph records comprising in combination, means for rotating the record in a semi-plastic state, a horizontally movable head, a vertically movable slide carried by the head, and a rotatable mandrel carried by said slide, substantially as and for the purposes set forth.

4. Apparatus for finishing the interior of a duplicate phonograph record, comprising means for rotating the record in a semi-plastic state, a member, the surface of which is arranged at an angle to the axis of the record, and means for introducing the mandrel within the record and for engaging the same with the bore thereof so as to displace the semi-plastic material, substantially as and for the purposes set forth.

5. Apparatus for finishing the interior of a duplicate phonograph record, comprising means for rotating the record in a semi-plastic state, a cylindrical member the axis of which is arranged at an angle to the axis of the record, and means for introducing the mandrel within the record and for engaging the same with the bore thereof so as to displace the semi-plastic material, substantially as and for the purposes set forth.

This specification signed and witnessed this 3rd day of April 1907.

JONAS W. AYLSWORTH.

Witnesses:
FRANK D. LEWIS,
ANNA R. KLEHM.